United States Patent [19]

Walsh et al.

[11] 3,803,629

[45] Apr. 9, 1974

[54] GRAPHICAL RECORDING SYSTEM

[75] Inventors: George M. Walsh, Middletown; Mark A. Chramiec, Newport; William R. Backman, Jr., Portsmouth, all of R.I.

[73] Assignee: Raytheon Company, Lexington, Mass.

[22] Filed: May 29, 1973

[21] Appl. No.: 365,011

[52] U.S. Cl. ................. 346/33 R, 178/30, 340/3 R, 340/324 AD, 346/62

[51] Int. Cl. ............................................ G01d 9/00

[58] Field of Search .......346/33 EC, 33 R, 34, 62; 340/324 AD, 3 R, 3 C; 343/5 PC, 5 EM; 178/30

[56] References Cited

UNITED STATES PATENTS

| | | | |
|---|---|---|---|
| 3,182,308 | 5/1965 | Dutton et al. | 343/5 |
| 3,683,403 | 8/1972 | Okino | 346/33 EC |
| 3,686,662 | 8/1972 | Blixt | 340/324 A |

*Primary Examiner*—Joseph W. Hartary
*Attorney, Agent, or Firm*—Milton D. Bartlett; Joseph D. Pannone; David M. Warren

[57] ABSTRACT

A graphical recording system in which a symbol generator is operated synchronously with the recording mechanism to imprint a message on the record temporaneously with the recording operation. The symbol generator utilizes a dot matrix representative for each symbol of the message which is displayed. A set of these dots is stored for each symbol and, when a symbol is selected, the dots are read out of a storage media in a series of sequences corresponding to the rows of a symbol into a second storage media. The first row for each symbol of the message is then read out of the second storage media followed by subsequent rows so that the entire message is imprinted row by row on the record.

21 Claims, 9 Drawing Figures

GRAPHICAL RECORDING SYSTEM

BACKGROUND OF THE INVENTION

A variety of display devices are presently available in which various symbols can be displayed upon command. Of particular interest is the type of display customarily used in sonar recordings of the ocean bottom in which a stylus makes consecutive passes across a moving tape of recording paper in a direction perpendicular to the motion of the tape so that markings by the stylus on the tape can form a continuous record of a sonar sounding operation. A problem arises in that the presently available electronic symbol generating equipment cannot be readily combined with a sonar depth recorder to imprint a message on the record along with the sonar recordings.

SUMMARY OF THE INVENTION

The foregoing problem with the prior art and other advantages are provided by a graphical recording system in accordance with the invention wherein a set of symbols of which a message may be composed are stored in a first storage medium. Each of these symbols is formed from a dot matrix and, accordingly, there is stored in the first storage medium a sequence of these dots. The stored sequence consists of a plurality of subsequences of the dots, each of these subsequences representing one row of the dot matrix. To compose a message, a succession of the symbols is selected to be written on the display. Thus, the complete message may be regarded as being formed by one large matrix of dots. This writing is accomplished by writing one row of the dot matrix of each symbol in the message so that one row of the matrix for the entire message is written first, this being followed by a writing of the second row and then subsequent rows of the dot matrix of the entire message until a complete line of the message has been imprinted on the display. In order to accomplish this row by row writing, the selected symbols which are stored in the first storage medium are read into a second storage medium by way of breaking up the sequence of dots for each symbol into subsequences corresponding to each row of a symbol matrix, and then reordering the subsequences of the individual symbols such that the subsequence of the first row of a symbol is placed in the second storage medium adjacent the first row of the next symbol of the message and, similarly, with the other rows of the symbols of the message. This permits a reading out of the message from the second storage medium in synchronism with the movement of the stylus and in accordance with the speed of the tape of a sonar depth recorder.

BRIEF DESCRIPTION OF THE DRAWINGS

The aforementioned aspects and other advantages of the invention are explained in the following description taken in connection with the accompanying drawings wherein.

DESCRIPTION OF THE PREFERRED EMBODIMENT

Figure 1:
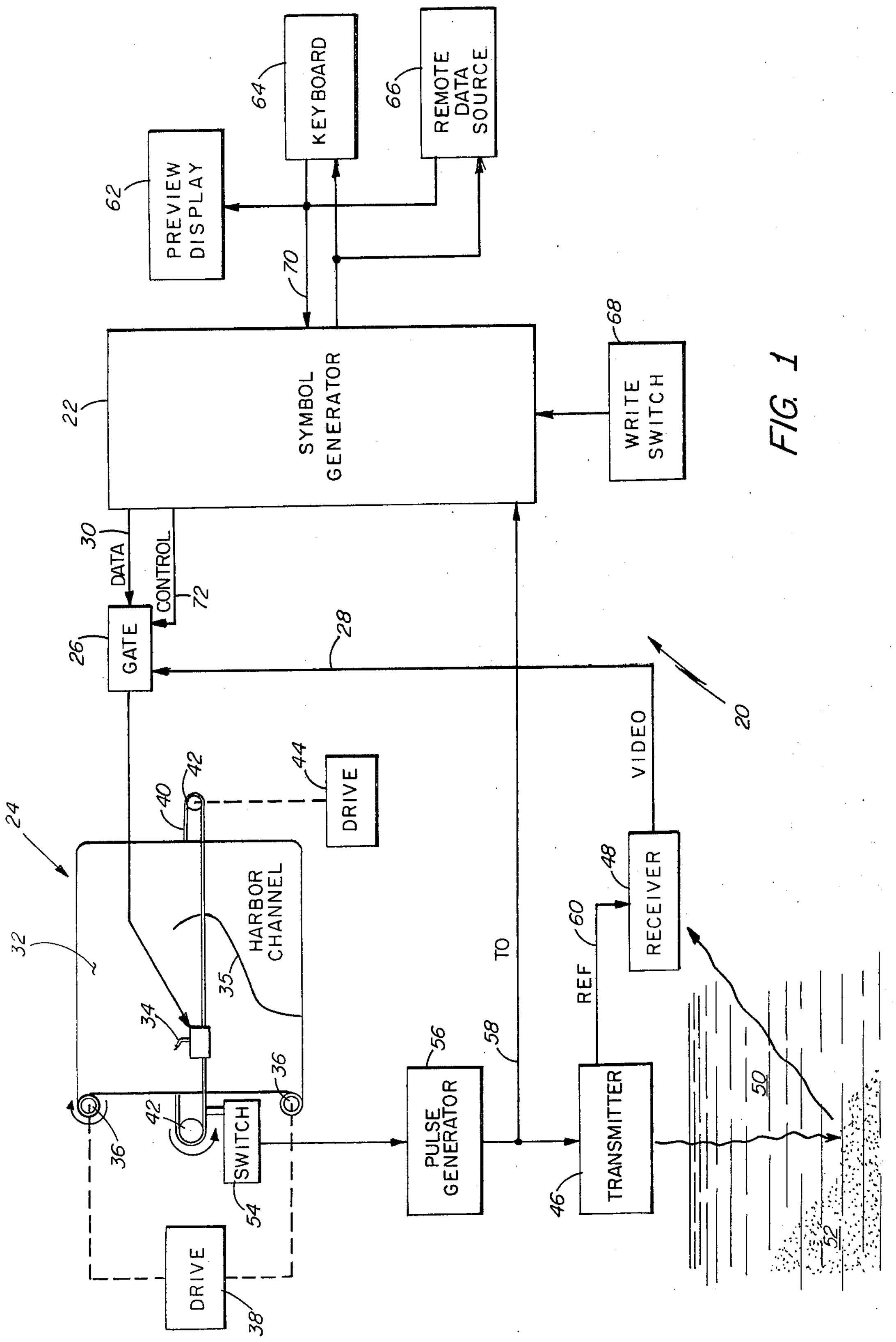
FIG. 1 is a block diagram of a sonar depth sounder connected to a symbol generator in accordance with the invention for imprinting a message on the sonar depth recording.

Referring now to FIG. 1 there is shown a recording system 20 wherein a symbol generator 22 is connected in accordance with the invention to a recorder 24 via a gate 26 which permits the entry of video data on line 28 concurrently with symbol data on line 30 to be imprinted on the paper 32 of the recorder 24 by a stylus 34. The symbol data is shown by way of example as the legend "HARBOR CHANNEL" which has been imprinted at a position adjacent the recording of a channel 35. The recorder 24 is of a form typically utilized with sonar systems and shown by way of example as comprising rollers 36 which are rotated by a drive unit 38 to transport the paper 32 downwardly past the stylus 34. The stylus 34 is carried by a belt 40 which is made to pass over pulleys 42 by a drive unit 44.

The sonar system is represented by a transmitter 46 and receiver 48, the transmitter 46 seen transmitting radiant energy through the ocean waters 50 toward the bottom 52 from which it is reflected to the receiver 48. A switch 54 in the recorder 24 is activated by the stylus 34 by each of its passes past the switch 54, and in response thereto, the switch 54 activates a pulse generator 56 to generate a pulse on line 58 which will be referred to hereinafter as the To pulse. In response to each To pulse, the transmitter 46 transmits the aforesaid radiant signals and also transmits a reference or a replica signal along line 60 which may be utilized by the receiver 48, for example, to permit correlation detection. The output of the receiver 48 is conveniently provided in digital format wherein a logic 1 is provided on line 28 when the received signal is above a threshold and a logic 0 is provided on line 28 when the received signal is below the threshold, or the data on line 28 may be analog whereby the signal amplitude is a measure of the strength of the returning echo.

The symbol generator 22 is coupled to a preview display 62, a keyboard 64, a remote data source 66 and a write switch 68. The keyboard 64 and the remote data source 66 are coupled in parallel and each provides a set of circuit closures, as will be described with reference to the keyboard 64, for selecting symbols which are coupled via cable 70 to the symbol generator 22. The preview display 62 is also connected to the cable 70 to show a person who operates the keyboard 64 a preview of the message prior to its inscription on the paper 32 on the recorder 24. When the desired message appears in the preview display 62, the write switch 68 is then operated to signal the symbol generator 22 to provide electronic signals along line 30 representing the individual symbols of the message via gate 26 to the stylus 34, the electronic signals activating the stylus 34 to imprint the message on the paper 32. A control line 72 is also provided whereby the symbol generator 22 sends a blanking signal to the gate 26 to permit blanking of the video data of line 28 during the inscription of the message of line 30. If desired, the blanking can be omitted by means of a switch within the gate 26 as will be described hereinafter.

Figure 2:
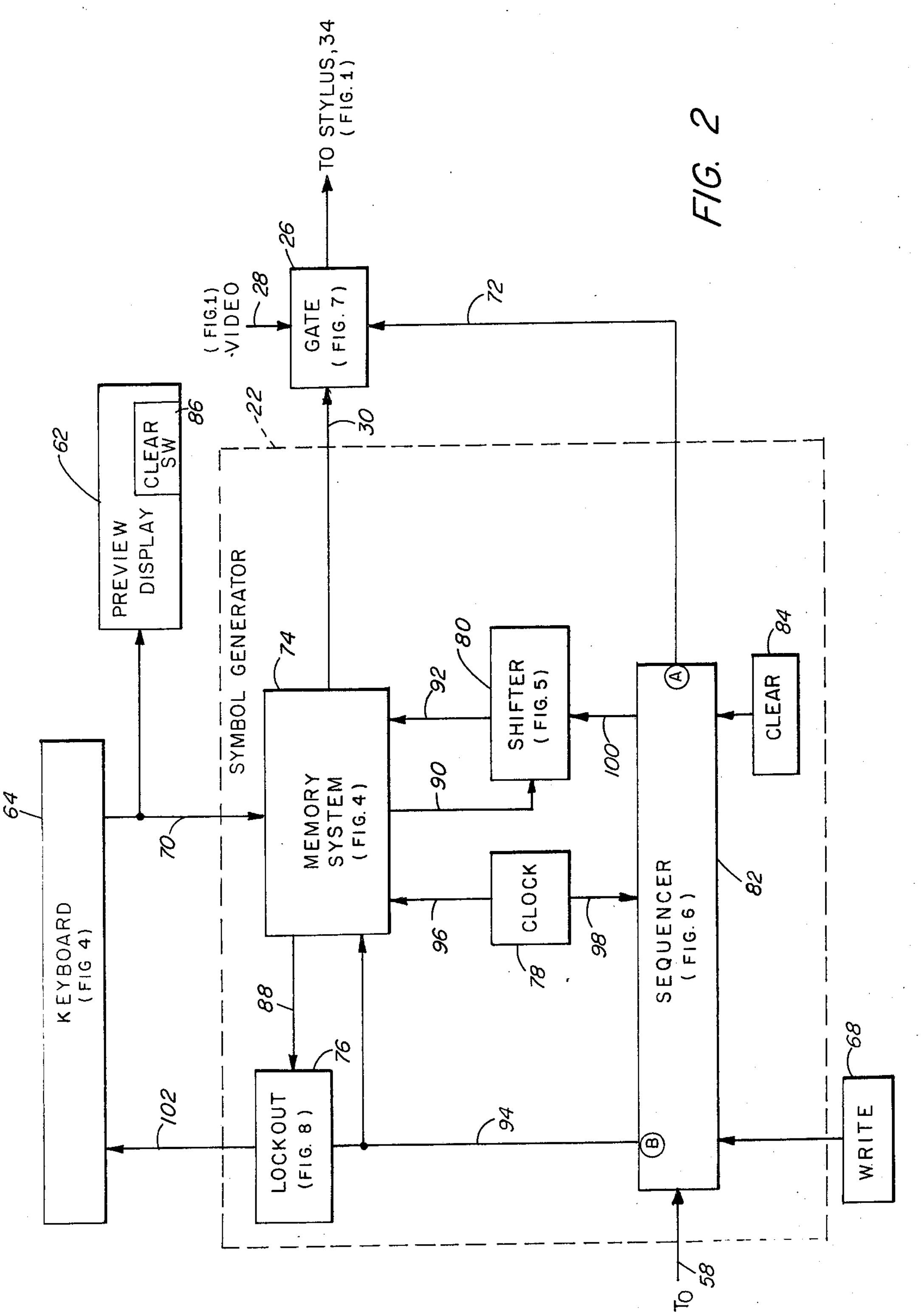
FIG. 2 is a block diagram of the symbol generator of the invention.

Referring now to FIG. 2, there is shown a block diagram of the symbol generator 22 which is seen to comprise a memory system 74, a lock-out circuit 76, a clock 78, a shifter circuit 80, a sequencer 82, and a clear switch 84. The clear switch 84 is utilized, in a manner to be described, for clearing out the message entered into the symbol generator by the keyboard 64 whenever it is desired to change that message. Another clear switch 86 is also included in the preview display 62 for similarly clearing the message displayed therein. The memory system 74 is coupled via a cable 88 to the lock-out circuit 76 and via cables 90 and 92 to the shifter circuit 80. Line 94 couples signals from the sequencer 82 to the lock-out circuit 76 and the memory system 74. Clock signals are provided along line 96 to the memory system 74 and along cable 98 to the sequencer 82. Signals are coupled from the sequencer along cable 100 to the shifter circuit 80.

Briefly, the system of FIG. 2 operates as follows, the details of the operation to become evident in the explanation which follows hereinafter. The memory system 74 comprises two storage media, the first being utilized to store the components of individual symbols while the second storage medium is utilized to store an entire message of symbols as selected by the keyboard 64, the components of these selected symbols being stored in a reordered format which permits the message to be read out in a manner which conforms to the movements of the stylus 34 and paper 32 of FIG. 1. As the components of each symbol are being reordered, a signal is sent along the cable 88 which activates the lock-out circuit 76 to inhibit the entry of any further symbols by the keyboard 64 until the completion of the reordering of the components of that selected symbol, this inhibiting being accomplished via a signal on line 102. The reading out of the message along line 30 is accomplished by means of the sequencer 82 which is, in turn, synchronized to the recorder 24 by means of the To pulse on line 58. The sequencer 82 beings operation when activated by the write switch 68. It sends a signal along 94 to the lock-out circuit 76 to prevent the entry of further symbols from the keyboard 64, and also sends a signal on line 94 to the memory system 74 to place the second storage media in a mode for reading out data. The shifter circuit 80 is utilized in providing shifting signals for shifting data in the second storage medium, this data being shifted into the second storage medium during the entry of a message from the keyboard, and again being shifted during the read-out of data when the message is being inscribed by the recorder 24. Shift commands for the various registers (to be described hereinafter) of the second storage medium are transmitted along cable 90 for reading in the data, and shift command signals are provided along cable 100 from the sequencer 82 to the shifter circuit 80 during the reading out of the data from the second storage medium; both of these shift signals being applied by the shifter along cable 92 to the second storage medium.

Figure 3:
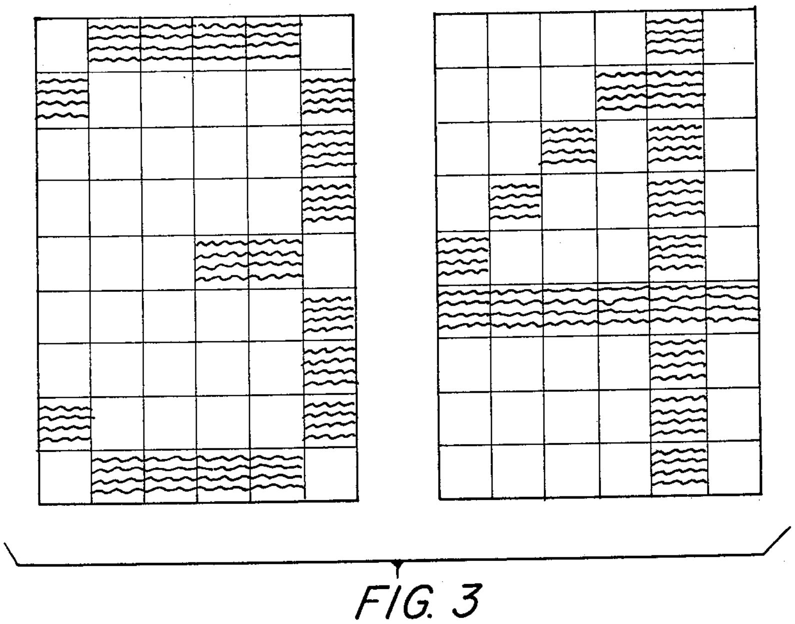
FIG. 3 shows a dot matrix representation of a symbol provided by the symbol generator.

Referring now to FIG. 3, there is shown the dot matrix representation of symbols provided by the symbol generator 22 of FIG. 1. The symbols are shown by way of example as the numerals 3 and 4, and, for example, each is seen to comprise a matrix of 54 cells arranged in a rectangular array of none rows and six columns. Any matrix could be used, i.e., a 35 dot five by seven matrix, etc. Certain ones of these cells are seen to be darkened while others remain light, the darkened cells representing the numerals 3 and 4. Since this darkening is accomplished by means of a stylus 34 of FIG. 1 in its passes over the paper 32, several passes or strokes by the stylus may be required to fill in a single cell depending on the stylus size and character dimensions desired. In this example, the stylus 34 is seen to make four strokes across the paper 32 to fill in one row of cells in each of the matrices. The spacing between each of the strokes depends on the speed of the paper 32 as it passes over the rollers 36, this spacing also depends on the time interval between passes of the stylus 34. It thus becomes apparent that, to properly draw in a symbol by means of the moving stylus 34, the speed at which the paper 32 is scanned past the stylus 34 need be inserted into the sequencer 82 of FIG. 2 in order to control the size or, more particularly, the height of the symbol. The insertion of this recorder speed data will be described hereinafter with reference to FIG. 6.

The two symbols are written by the stylus in the same fashion, however, it should be noted that since this message is comprised of two symbols, the stylus 34 in passing over the paper 32 will sketch in the bottom row of the numeral 3 and the bottom row of the numeral 4 simultaneously, and then after the paper 32 has progressed a full row height, the stylus 34 then begins to sketch in the second row from the bottom simultaneously for the numeral 3 and the numeral 4. In the preferred embodiment of the invention, the symbol generator 22 is provided with a capability of presenting a message having a length of 16 symbols. Accordingly, it is seen that the data provided along line 30 of FIG. 1 must comprise a complete description first of the bottom row of each of the 16 symbols or whatever number of symbols has been selected for the message; and then subsequently after the stylus 34 has provided a sufficient number of strokes to fill in the bottom row of each of the symbols of the message, the data on line 30 then changes to represent the second row from the bottom of each of the symbols in the message. The memory system 74 of FIG. 2 provides for a reordering of the stored data relative to each cell of a symbol matrix so that the data is provided in a sequence which permits the entire message to be written one row at a time.

Figure 4:
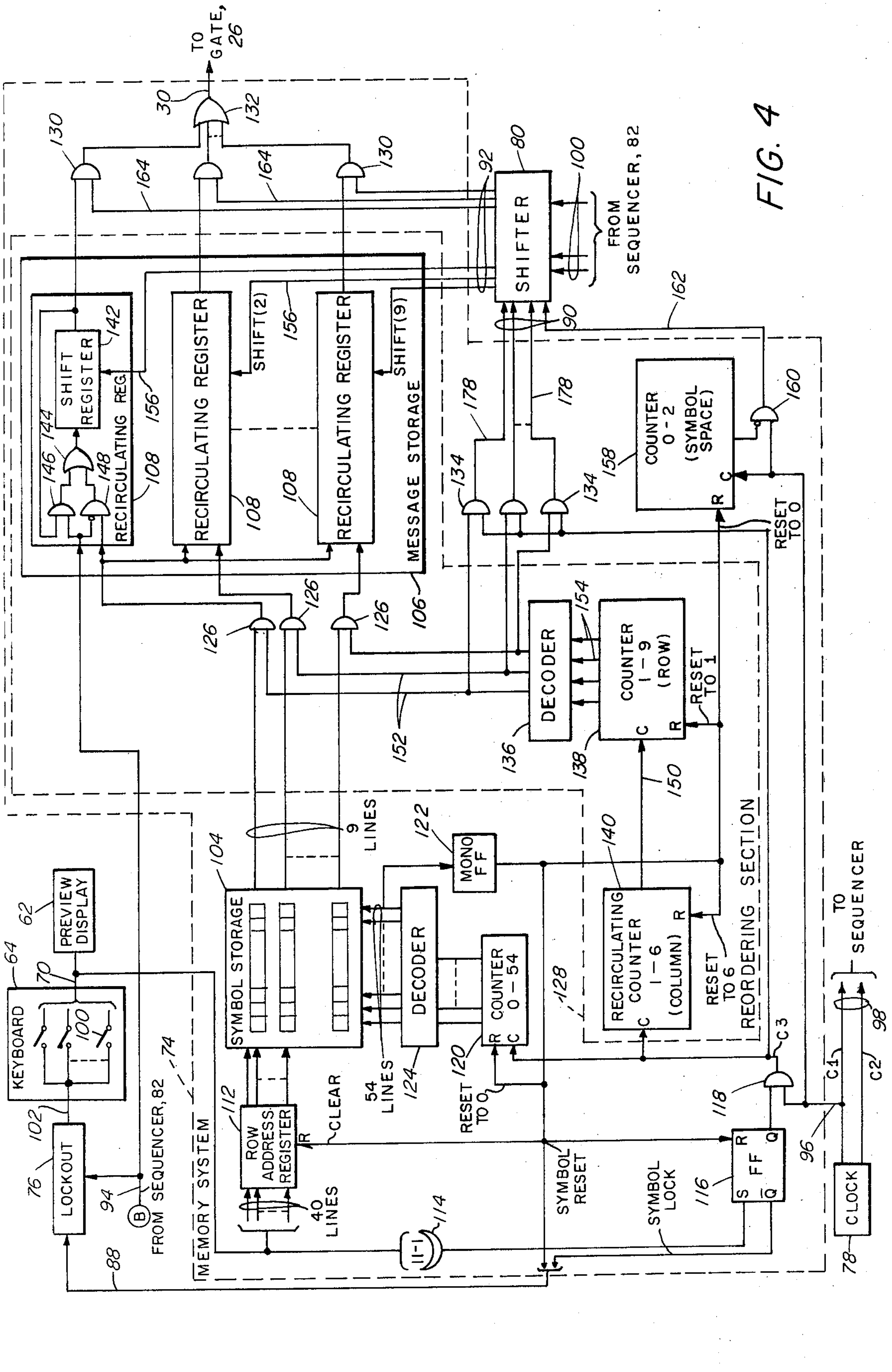
FIG. 4 is a block diagram of a memory system of FIG. 2.

Referring now to FIG. 4, there is shown a block diagram of the memory system 74 shown interconnected via the lock-out circuit 76 to the keyboard 64 as was seen with reference to FIG. 2. Also seen are the interconnections of the memory system 74 to the clock 78, the shifter circuit 80 and the gate 26 as was seen in FIG. 2. The memory system 74 comprises two storage media, one being a read-only memory shown as a symbol storage 104 and the second storage medium being a bank of recirculating registers shown as a message storage 106. While other forms of memories can be utilized, the read-only memory for the symbol storage 104 and the recirculating registers for the message storage 106 facilitate implementation of the preferred embodiment of the invention. The read-only memory of the symbol storage 104 is represented pictorially by 40 rows providing a capacity of 40 possible symbols for composing a message portrayed on the recorder 24.

Each of the 40 rows is seen comprising 54 cells for storing the bits of data corresponding to the 54 cells of the matrix of FIG. 3; thus, for example, the first six cells in each row contain the data for the bottom row of the symbol matrix of FIG. 3, the second set of six cells contains the data for the second row from the bottom of the matrix ans similarly for corresponding groups of six cells and rows of the matrix with the last six cells in each of the 40 rows of the symbol storage 104 corresponding to the top row of the matrix representation for each of the symbols.

The message storage 106 is seen comprising nine recirculating registers 108, each of which has a capacity for storing one row of a message comprised of 16 symbols, each of the 16 symbols being one of the 40 symbols which is selected by commands of the keyboard 64 in a manner to be described. In particular, it is noted that each row of the symbol storage 104 contains data for all of the rows of the matrix representation for an individual symbol; on the other hand, each recirculating register 108 contains data for all of the 16 selected symbols but such data represents only one row of the matrix representation of each of these symbols. The selection of the particular symbols to be presented in the message, as well as the conversion from the format of storage in the symbol storage 104 to the format of storage in the message storage 106 will now be described.

The keyboard 64 is seen to comprise 40 switches 110, each of which is operated by a corresponding key (not shown) of the keyboard 64 for selecting a particular symbol to be displayed. The cable 70 comprises 40 lines corresponding to each of the 40 switches 110. Using binary coding/decoding techniques, cable 70 could be reduced to just 6 lines. A register 112 is provided in the memory system 74 for coupling the keyboard 64 to the symbol storage 104. The register 112 comprises, for example, a set of flip-flops (not shown) each of which is set by a signal on the corresponding line of the cable 70 and applied as signal to the corresponding row of the symbol storage 104 to read-out data stored within that row. Each of the 40 lines in the cable 70 also go to the preview display 62 to display the symbol corresponding to the particular switch 110 that was activated. The preview display 62 can show a message of 16 symbols with each symbol appearing sequentially in accordance with the operation of the switches 110.

The memory system 74 also comprises an OR gate 114, a flip-flop 116, an AND gate 118, a counter 120, a flip-flop 122 and a decoder 124. Clock pulses are provided by the clock 78 at a repetition frequency of, for example, 300 kHz on line 96, these clock pulses being designated as the C1 pulses. The C1 pulses pass through the AND gate 118 when the Q output of flip-flop 116 is at a logic state of 1. Those clock pulses being passed by the AND gate 118 are designated as the C3 pulses. The C3 pulses are applied to the counter 120 which in turn is coupled via the decoder 124 to selection terminals of the symbol storage 104. In response to a series of C3 pulses, the counter 120 counts from 0 to 54 and applies this count to the decoder 124. The decoder 124 in response to the binary output of the counter 120 energizes individual ones of its output lines corresponding to instantaneous values of the count of the counter 120. Each output line of the decoder 124 activates a corresponding cell of the row of the symbol storage 104 which has been selected by the register 122. Thus, the register 122 addresses a particular row while the decoder 124 designates the data of the particular cell within that row which is to be read out of the symbol storage 104. In this way, successive cells of a selected row of the symbol storage 104 are read out through a corresponding AND gate 126 which, in turn, couples the read-out data to a corresponding recirculating register 108.

The flip-flop 116 is of the set-reset type which is set by a logic 1 provided by the OR gate 114 and is reset by a logic 1 appearing at the output of the flip-flop 122. The flip-flop 116 serves to admit a sequence of C3 pulses to the counter 120 for the aforesaid reading out of the data of the symbol storage 104, and it also serves to signal the lock-out circuit 76 to disable the keyboard 64 until the counter 120 and decoder 124 have readout the data of all 54 cells in a selected row of the symbol storage 104. The activation of a single switch 110 of the keyboard 64 passes a logic 1 through the OR gate 114 to set the flip-flop 116. Thereupon the logic state of 1 appears at the Q terminal to pass the C3 pulses through the AND gate 118. When the 54th output line of the decoder 124 is energized, the signal on this line triggers the flip-flop 122. The flip-flop 122 is a monostable flip-flop which provides a logic state of 1 on the symbol reset line. The symbol reset line couples the output of the flip-flop 122 to a reset terminal of the counter 120, to a reset terminal of the register 112 for clearing the register, to the reset terminal of the flip-flop 116 and also to the lock-out circuit 76 via the cable 88. Thus, upon the energization of the 54th line of the decoder 124, the flip-flop 122 resets the flip-flop 116 thereby inhibiting any further flow of the C3 pulses.

The $\bar{Q}$ output of the flip-flop 116 serves as a symbol lock-out signal which is passed via cable 88, lock-out circuit 76 and line 102 to the keyboard 64. When this signal has a logic 1 value, the closing of a switch 110 accomplishes the aforementioned addressing of the symbol storage 104. The presence of a logic 0 value on line 102 prevents the energization of the register 112 by a switch 110. This logic 0 state on line 102 is accomplished either by the presence of a logic 0 state at the $\bar{Q}$ output of the flip-flop 116 by the energization of the symbol reset signal by the flip-flop 122, or by the presence of a logic 1 signal on line 94 from terminal B of the sequencer 82 as will be described subsequently with reference to the lock-out circuit 76 of FIG. 8.

In operation, therefore, the closing the switch 110 provides an address signal via the register 112 to the symbol storage 104. The address signal is coupled via the OR gate 114 to the flip-flop 116 which inhibits, via the symbol lock-out signal, any further addressing by the switches 110 of the keyboard 164. The flip-flop 116 furthermore initiates the reading out of the data of successive cells of the selected row of the symbol storage 114, and upon completion of this reading out, the flip-flop 122 resets the flip-flop 116 thereby permitting the entering of a second symbol via the keyboard 64.

The memory system 74 comprises a reordering section 128 which comprises the aforementioned message storage 106 and AND gates 126, and further comprises AND gates 130, OR gate 132, AND gates 134, a decoder 136 and two counters 138 and 140. Each recirculating register 108 of the message storage 106 is seen to include a shift register 142 and steering logic which comprises an OR gate 144 and two AND gates 146 and 148. The reordering section 128 is set in operation contemporaneously with the reading out of data from the symbol storage 104. The reordering is accomplished by the AND gates 126, the decoder 136 and the two counters 138 and 140. The counter 140 is energized by the same signals as is the counter 120 as was previously described, the signals being the reset signal from the flip-flop 122 and the C3 clock pulses from the AND gate 118. The counter 140 is a recirculating counter which counts modulo 6, one count being registered in response to each of the C3 pulses. Each time a count of six is attained by the counter 140, the counter 140 transmits a pulse along line 150 to the clock input of the counter 138. In this respect, the counter 140 acts as a divide-by-6 with the counter 138 counting the number of occurrences of sequences of six C3 pulses. The decoder 136 has nine output lines 152, and energizes successive ones of these output lines in response to the count of the counter 138 through which it is coupled via lines 154. The flip-flop 122 resets both the counters 138 and 140 with the aforementioned symbol reset signal, the counter 138 being reset to a count of one and the counter 140 being reset to a count of six. Thus, it is seen that during the occurrences of the first six C3 pulses a first one of the lines 152 is energized, that during the second set of six C3 pulses, a second one of the lines 152 is energized, this procedure continuing until the last six C3 pulses which occur during the energization of the ninth of the lines 152. Successive ones of the AND gates 126 pass signals from the symbol storage 104 to respective ones of the recirculating registers 108 in response to energization by successive ones of the line 152 with the result that the first six cells of a selected row of a symbol storage are passed into the first recirculating register 108, the data of the second set of six cells of the selected row of the symbol storage 104 is passed into the second recirculating register 108, this operation continuing until the last six bits of data of a selected row of the symbol storage 104 are passed into the ninth recirculating register 108.

As has been previously mentioned, the data in each row of the symbol storage 104 is arranged so that the data describing the bottom row of the matrix of FIG. 3 is read out first from the symbol storage 104, with the data of successive matrix rows being read-out sequentially from the symbol storage 104. Since, the data of each group of six cells is passed into a separate recirculating register, each recirculating register 108 has the desired data of a particular row of the matrix of FIG. 3. In response to each symbol as selected by the keyboard 64, the first recirculating register 108 stores sequentially the data of the first matrix row for each of the selected symbols, the second recirculating register 108 stores sequentially the data of the second matrix row of each of the selected symbols and similarly for each of the other recirculating registers 108. Thus, the foregoing operation accomplishes the reordering of the stored symbol data.

The reordered data which is placed in each of the recirculating shift registers 108 is stored in a shift register 142. As each bit of data enters the shift register 142, each of the preceding bits of data are shifted one space by the shift lines of the cable 92 to provide space for the entering data. Nine shift lines are provided, one for each of the shift registers 142. The shift signals are provided by the shifter circuit 80 and the AND gates 134, the AND gates 134 admitting the C3 pulses to the shift register 142 corresponding to a specific one of the lines 152 as energized by the decoder 136. The shifter circuit, as will be described in greater detail with reference to FIG. 5, permits energization of the shift lines 156 by either the decoder 136 for reading data into the message storage 106, or by the sequencer 82 for reading data out of the message storage 106 in a manner to be described.

The memory system 74 also comprises a counter 158 and an AND gate 160 for providing spaces between the symbols in the recirculating registers 108. The counter 158 is coupled to the flip-flop 122 and is reset to 0 immediately after a symbol is entered into the message storage 106. The clock input of the counter 158 is connected to lines 96 for receiving C1 pulses, the C1 pulses being applied to an input of the AND gate 160 while the output of the counter 158 is applied to a complemented input of the AND gate 160. The counter 158 counts to 2 and then provides a logic 1 signal to the complemented input of the AND gate 160 thereby permitting only two of the C1 pulses to pass through the AND gate 160 immediately after each of the reset signals provided by the flip-flop 122. The output of the AND gate 160 is coupled via line 162 and the shifter circuit 80 to the shift lines 156 for shifting each shift register 142 two spaces after the entry of each symbol into the message storage 106, thereby providing spaces between the symbols so that when these symbols are read out of the message storage 106 to be displayed on the recorder 24 of FIG. 1, the appropriate spacing will appear between the symbols of the message.

The steering logic of the recirculating register 108 operates in response to the logic state of the signal on line 94 from terminal B of the sequencer 82. A logic state of 0 applied to the complemented input of AND gate 148 renders this gate conductive to data pulses arriving from AND gate 126 while rendering the AND gate 146 nonconductive to pulses incident thereupon from the output of the shift register 142. Thus, a logic state of 0 on line 94 provides for the entry of data into the shift register 142 via AND gate 126, AND gate 148 and OR gate 144. A logic state of 1 on the line 94 permits data in the shift register 142 to be recirculated via AND gate 146 and OR gate 144 in response to each shift signal on the line 156.

To read the data out of the message storage 106 for imprinting the message on the paper 32 of FIG. 1, a logic state of 1 is presented on line 94 and the shift signals on lines 156 are energized in a manner to be described by the sequencer 82. The data is read out from one recirculating register 108 at a time so that one row of the matrix of FIG. 3 is printed at a time. As was described previously, the symbol 3 of FIG. 3 was constructed by allowing the stylus 34 of FIG. 1 to make four passes through each row of the matrix, thus being done to provide the desired height to the symbol 3. Accordingly, the line 94 is provided with a logic state of 1 for a sufficient period of time to allow the shift register 142 to recirculate its data four times so that the stylus will rewrite the data of each row a total of four times. The data for each row is selected by a specific one of the AND gates 130 in response to a logic 1 signal on the corresponding line 164 from the shifter circuit 80 in a manner to be described. The outputs of the AND gate 130 are coupled by OR gate 132 and line 30 to the gate 26 to couple the data to the recorder 24.

Figure 5:
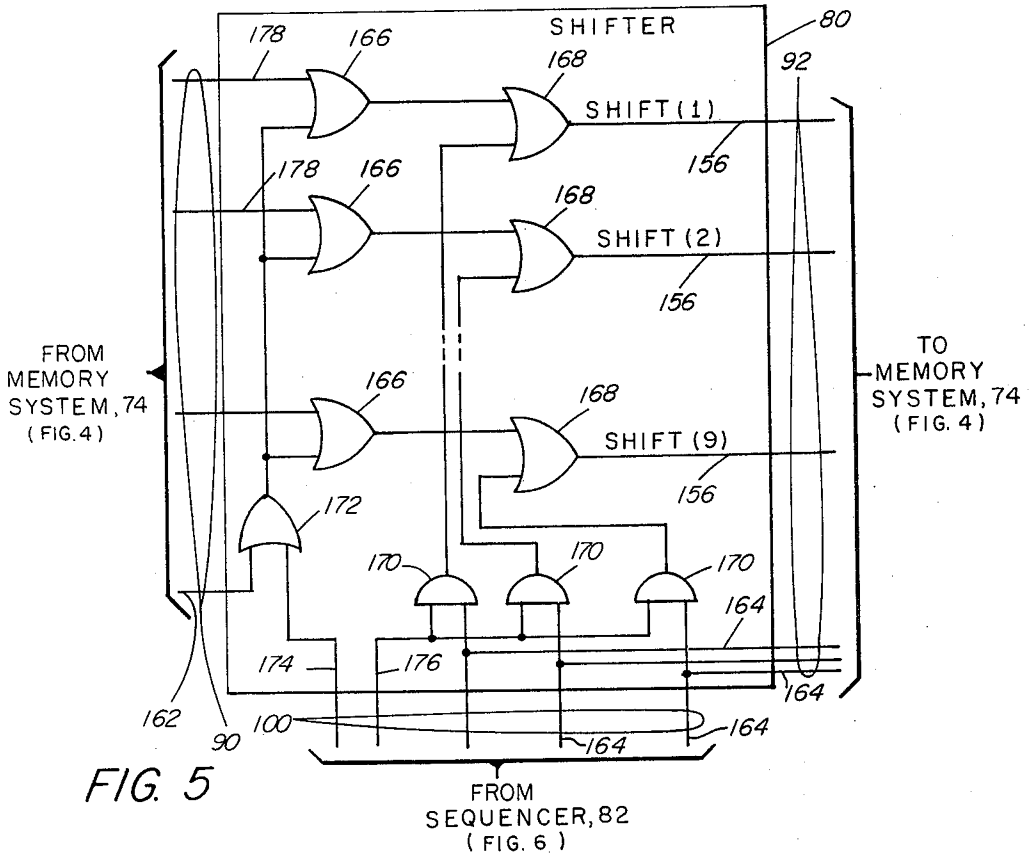
FIG. 5 is a block diagram of a shifter unit of FIG. 2.

Referring now to FIG. 5, there is seen a diagram of the shifter circuit 80. The shifter circuit 80 comprises a set of nine OR gates 166, and a second set of nine OR gates 168, a set of nine AND gates 170 and an OR gate 172. The OR gate 172 is coupled to the memory system 74 by line 162 and is coupled to the sequencer 82 via line 174. One input terminal of each of the AND gates 170 are coupled to each other and to the sequencer 82 via line 176. The output of the OR gate 172 is coupled to one input terminal of each of the oR gates 166 while the other terminal in each of the OR gates 166 is coupled via cable 90 to respective ones of the AND gates 134 in FIG. 4. The output terminal of each of the OR gates 166 is coupled to an input in each of the corresponding OR gates 168, while the other input in each of the OR gates 168 is coupled to respective ones of the output terminals of the AND gates 170.

The output signals of the AND gates 134 on the lines 178 provide clock pulse signals, as was described hereinbefore, for the shift signals of the shift registers 142. The signal on line 178 passes through an OR gate 166 and through an OR gate 168 to reappear on the corresponding line 156 as the shift signal for the corresponding shift register 142. The signal on line 162 which provides two clock pulses for intersymbol spacing, as was described hereinbefore, passes through the OR gate 172 from whence it is coupled to and passes through all of the nine OR gates 166 and then through all of the nine OR gates 168 to the shift lines 156 for providing the spacing signal in each of the shift registers 142. The signal on line 174 which comprises a series of clock pulses utilized in clearing the shift registers 142, as will be described hereinafter, is coupled in the same manner as the signal on line 162 by the OR gates 172, 166 and 168 to each of the shift registers 142. The signals on lines 164 are coupled from the sequencer 82 by the shifter circuit 80 directly to the AND gates 130 of FIG. 4 for selecting the recirculating register 108 from which data is to be read out, as was described hereinbefore, the generation of these signals in the sequencer 82 to be described hereinafter with reference to FIG. 6. The lines 164, being similarly connected to respective ones of the AND gates 170 of the shifter circuit 80, enable a selected one of the AND gates 170 to pass shift pulses from line 176 through a corresponding OR gate 168 and line 156 to a corresponding shift register 142 for shifting the shift register 142 during a reading out of data therefrom, the generation of the signal on line 176 via the sequencer 82 to be described hereinafter with reference to FIG. 6.

Figure 6:
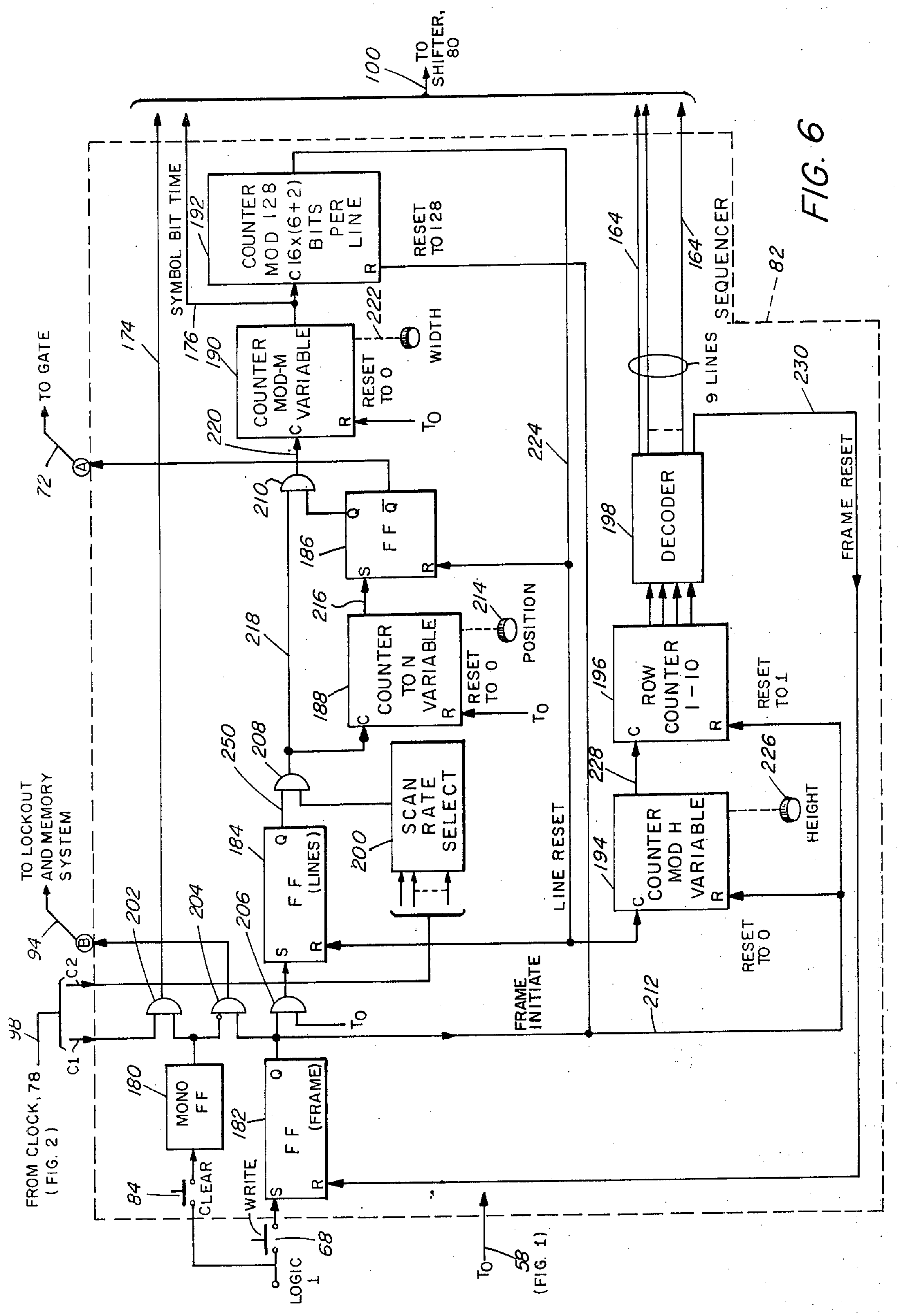
FIG. 6 is a block diagram of a sequencer unit of FIG. 2.

Referring now to FIG. 6 there is seen a block diagram of the sequencer 82 which comprises four flip-flops 180, 182, 184 and 186, five counters 188, 190, 192, 194, and 196, a decoder 198, a selector switch 200 and three AND gates 202, 204 and 206. Also seen in the figure are the clear switch 84 and the write switch 68 previously seen in FIG. 2. Cable 98 from the clock 78 brings the C1 pulses to the AND gate 202 and also provides clock pulse signals at differing pulse repetition frequencies, the signals being designated as the C2 pulses, to the selector switch 200. The aforementioned signal on line 94 from terminal B is seen to be provided by the output of AND gate 204. The aforementioned signal on line 72 from terminal A is seen to be provided by the $\overline{Q}$ output of flip-flop 186. The signals on the lines 174 and 176, previously mentioned with reference to FIG. 5, are seen to be provided by respectively the AND gate 202 and the counter 190. The signals on the lines 164, previously mentioned with reference to FIG. 5, are seen to be provided by the decoder 198. The To pulse, previously mentioned with reference to FIG. 2, is seen to be applied to AND gate 206, counter 188 and counter 190.

The output signals of the sequencer 82 utilized in operating the message storage 106 of FIG. 4 are provided in the following manner. The selector switch 200 is manually positioned to apply an appropriately selected one of the C2 pulse trains to AND gate 208, the C2 pulse train being selected in accordance with the scanning rate of the recorder 24 of FIG. 1. This selection of the appropriate clocking frequency enables the sequencer 82 to operate at a rate compatable with the speed of the paper 32 and the stylus 34, with precise synchronization to the stylus 34 being accomplished by means of the To pulse on line 58. Clock pulses from the AND gate 208 are applied to the counter 188 and are also applied via AND gate 210 to the counter 190; the counter 190, in turn, drives the counter 192 which drives the counter 194 which, in turn, drives the counter 196. Thus, all of the counters 188, 190, 192, 194 and 196 are seen to operate at rate proportional to the frequency of the selected C2 pulse train.

The sequencer 82 operates as follows during the writing of the message on the recorder 24. When the operator of the recording system 20 determines that the message in the preview display 62 of FIG. 1 is as desired and, accordingly, operates the write switch 68, the flip-flop 182 of the sequencer 82 which then provides from its Q output a logic 1 signal on line 212, this being the frame initiate signal which has a duration equal to the total length of time required for the writing of the message on the recorder 24. The frame initiate signal and other signals of the sequencer 82 will be seen in the timing diagram of FIG. 9. Line 212 couples the frame initiate signal to AND gates 204 and 206 and the counters 192, 194 and 196. In response to the presence of the frame initiate signal, the AND gate 206 passes the To pulses to the flip-flop 184 for setting the flip-flop 184 such that a logic 1 state appears at the Q terminal of the flip-flop 184. In response to the logic 1 appearing at the Q output of the flip-flop 184, the AND gate 208 passes the aforementioned C2 pulses to the counter 188 and the AND gate 210. Thus, the counter 188 begins to count upon the occurrence of the first To pulse after the operation of the write switch 68. The counter 188 is reset to 0 by the To pulse and counts to a number N which is selected by the knob 214, the counter 188 producing a pulse on line 216 when a count of N is attained. By way of example, the counter 188 may comprise a digital switch and comparator circuit (not shown) with the digital switch being operated by the knob 214 and the comparator comparing the count of the counter 188 with the number of the digital switch, this number being N. The counter 188 stops counting when it reaches the number N.

The signal on line 216 sets the flip-flop 186 which then provides from its Q output a logic 1 to the AND gate 210 thereby enabling the AND gate 210 to pass clock pulses from the AND gate 208. The flip-flop 186 in response to the signal on line 216 also provides from its $\overline{Q}$ output a logic 0 signal to the terminal A. It is thus seen that upon the occurrence of the To pulse, clock pulses appear on line 218 from the AND gate 208, but that none of these clock pulses appear on line 220 at the output of AND gate 210 until a time delay equal to the amount of time required for the counter 188 to reach a count of N. With reference to FIG. 1, it is seen that since the To pulse occurs when the stylus 34 is at the edge of the paper 32, the stylus 34 has progressed part way across the paper 32 by the time clock pulses appear on line 220; this delay serves to position the message on the paper 32 since, as will now be shown, the message does not begin to be written until after clock pulses appear on the line 220. Accordingly, the knob 214 serves to position the message on the paper 32.

Referring momentarily to FIGS. 1 and 3, it is recalled that each row of each symbol of the message comprises six cells of the matrix. However, the width of each cell, as portrayed on the paper 32, depends on how much time is allotted to the stylus 34 in portraying the data of each of the cells. Thus, if the data is read out of the message storage 106 of FIG. 4 at a slow rate, the stylus 34 travels a relatively large distance across the paper 32 during the time allotted for displaying each of the cells of a row of the matrix of FIG. 3 with the result that each symbol has a realtively large width. On the other hand, if the data is read out from the message storage 106 in a relatively fast rate, then the stylus 34 travels a relatively short distance during the portrayal of the data of any one cell with the result that each symbol is of relatively narrow width. The rate of read out of data from the message storage 106 is controlled by the counter 190. The counter 190 is a recirculating counter which counts modulo M where M is a number that is set in by a knob 222 in the same manner as the number N is set in the counter 188. The counter 190 is reset to 0 upon each occurrence of the To pulse. The counter 190 provides a pulse on line 176 upon each occurrence of a count of M, the succession of pulses on line 176 having been previously described with reference to the shifter circuit 80 of FIG. 5 wherein it was shown that each of the pulses on line 176 serve as shift pulses for the shift registers 142 of FIG. 4. It is thus seen that during the reading out of data from the message storage 106 of FIG. 4, that the shift pulses on lines 156 are delayed by intervals equal to the time required for the counter 190 to reach a count of M. The knob 222 which sets the length of this interval is thus seen to set the width of each symbol of the message portrayed on the recorder 24.

Since, in the preferred embodiment of the invention, the message storage 106 of FIG. 4 has a capability of a 16 symbol message, the sequencer 82 of FIG. 6 terminates the pulses on line 176 upon the completion of each pass of the stylus 34 of FIG. 1 through the area in which the message is being printed. Since in response to each pulse on line 176 a bit of data is read out of a recirculating register 108, it is apparent that since there are six bits of data for each symbol during each pass of the stylus 34, plus a reading out of two bits of data for the intersymbol spacing, there is a total of 128 bits in a 16 symbol message which are to be read out of the shift register during each pass of the stylus 34. The counter 192 counts modulo 128, the input to the counter being the pulses on line 176. The counter 192 is reset to a count of 128 by the frame initiate signal on line 212 and provides an output pulse on line 224 whenever a count of 128 is attained. The pulse on line 224 serves as a line reset signal and is applied to the flip-flops 186 and 184 to terminate the flow of clock pulses on the line 220.

Referring momentarily again to FIG. 3, it was noted that a number of passes, for example four passes, of the stylus 34 of FIG. 1 are required to provide the height of each cell of the symbol matrix. In FIG. 6, the counter 194 counts the occurrences of each line reset signal provided by line 224, the counter 194 being the same type counter as the counter 188 and counts modulo H where H is a variable number which is set by a knob 226. Upon each occurrence of the count of H, the counter 194 produces a pulse on line 228 which represents the conclusion of the printing of a row of the matrix of FIG. 3. Thus, the knob 226 serves to establish the height of each row of the matrix and, accordingly, the height of each symbol in the message.

The counter 196 counts each of the pulses appearing on line 228 and applies this count to the decoder 198 which in turn energizes the appropriate one of the lines 164 which corresponds to the count of the counter 196. The lines 164 were previously described with reference to the shifter circuit 80 of FIG. 5 wherein it was seen that these lines serve to select the particular recirculating register 108 of FIG. 4 which corresponds to the particular row of the matrix of FIG. 3 that is being read out. In this way, the counter 194 by its counting the number of stylus passes in each cell, in cooperation with the counter 196 which counts each matrix row that has been completed by the stylus 34, selects the appropriate recirculating register 108.

The counter 194 is reset to 0 by the frame initiate signal and is thereby initialized by the beginning of each message. Similarly, the counter 196 is reset to 1 by the frame initiate signal so that at the beginning of each message the first one of the lines 164 is energized with a logic 1 signal. The counter 196 counts up to 10 and the 10th line, shown as line 230, provides a frame reset signal which resets the flip-flop 182 when the counter 196 reaches the count of 10. The resetting of the flip-flop 182 terminates the writing of the message on the recorder 24 of FIG. 1.

The clear switch 84 of FIG. 6 clears out the message storage 106 in the following manner. The switch 84 triggers the flip-flop 180 to provide a logic state of 1 at an input of AND gate 202 as well as at the complemented input of AND gate 204. The flip-flop 180 is a monostable flip-flop which automatically restores a logic state of 0 at its output after a preset amount of time. The logic state of 1 permits the clock pulse C1 to pass through the AND gate 202 onto line 174 which, as has been described earlier with reference to FIG. 5, sends shift pulses to the shift registers 142. The duration of the output pulse of the monostable flip-flop 180 is sufficiently long to permit a sufficient number of shift pulses, at least 128 shift pulses, to be applied to the shift register 142, this occurring at a time when no input signals are being applied by the AND gates 126 of FIG. 4. In addition, the logic state of 1 applied by the flip-flop 180 to the complemented input of the AND gate 204 prevents any signal from being transmitted from the terminal B of the sequencer 82 along line 94 to the steering logic of the recirculating register 108 thereby insuring that the AND gate 146 does not recirculate any pulses through the shift register 142 during the clearing operation.

Figures 7, 8:
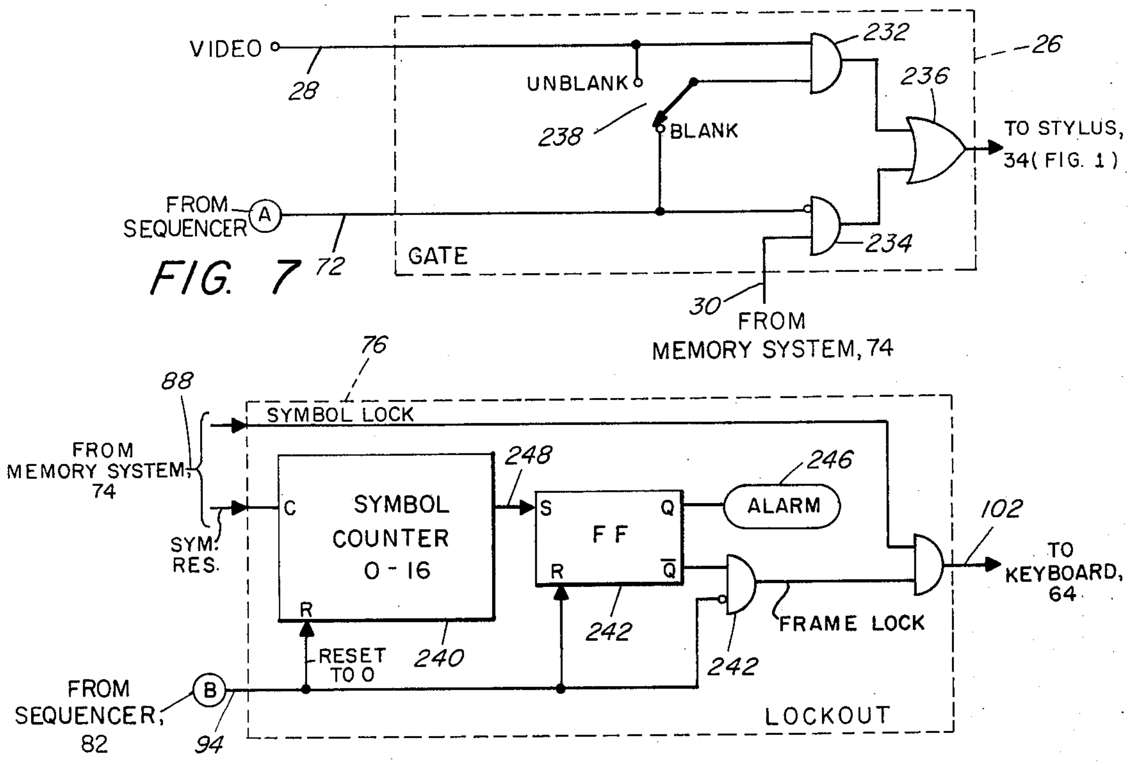
FIG. 7 is a block diagram of a gate unit of FIG. 2.
FIG. 8 is a block diagram lock-out unit of FIG. 2.

Referring now to FIG. 7 there is shown a diagram of the gate 26, previously seen in FIG. 2. The gate 26 comprises two AND gates 232 and 234 which have their outputs coupled to an OR gate 236. The gate has three input lines 28, 30 and 72 which were previously described with reference to FIGS. 1 and 2. Line 28 providing video data from the receiver 48 of FIG. 1 is coupled to one terminal of a switch 238 and to an input of the AND gate 232. The other input of the AND gate 232 connects with the switch 238. Line 72, which provides a logic 0 signal from terminal A of the sequencer 82 of FIG. 6, is seen connecting with a terminal of the switch 238 and also with a complemented input of the AND gate 234. The other input of the AND gate 234 is connected via line 30 to the output of the OR gate 132 of the memory system 74 of FIG. 4. The switch 238 serves to couple an input of the AND gate 232 to the line 72 or, alternatively, to couple that input of the AND gate 232 to the line 28. In the configuration shown in FIG. 7, the input of the AND gate 232 is coupled via the switch 238 to line 72 with the result that the presence of a logic 0 signal on line 72 inhibits the passage of video data along line 28 through the AND gate 232 into the OR gate 236. The logic 0 signal on line 72 being applied to the complemented input of the AND gate 234 enables signals from the memory system 74 to pass along line 30 through the AND gate 234 and into the OR gate 236 which then passes the signal to the stylus 34 of FIG. 1. Thus, it is seen that the switch 238 provides for either a blanking or unblanking of the video data on line 28. When the switch 238 disconnects an input terminal of the AND gate 232 from line 72, the video data on line 28 passes through both input terminals of the AND gate 232 and to the OR gate 236 to the stylus 34 in which case there is no blanking by the logic 0 signal on line 72. While the AND gate 232 is adapted for passing digitized data signals on line 28, it is understood that the AND gate 232 could be replaced with an analog-type gate and, similarly, the OR gate 236 could be replaced with a summing network (not shown) so that analog data on line 28 could be combined with the message data on line 30 and passed onto the stylus 34.

Referring now to FIG. 8 there is shown a diagram of the lock-out circuit 76 previously seen in FIGS. 2 and 4. FIG. 8 also shows the lines 102 and 94 as well as the cable 88 comprising the symbol lock line and the symbol reset line, all of which were previously described with reference to FIG. 4. A signal on line 94 from terminal B of the sequencer 82 has also been described with reference to FIG. 6. The lock-out circuit 76 comprises a counter 240, a flip-flop 242, two AND gates 242 and 244 and an alarm indicator shown in the figure as a lamp 246. The counter 240 counts the number of symbol reset signals generated by the flip-flop 122 of FIG. 4, the counter 240 having a maximum count of 16 and providing an output pulse on line 248 upon attaining a count of 16. The pulse on line 248 sets the flip-flop 242 which, in turn, provides at its $\overline{Q}$ output a logic 0 signal to the AND gate 242 which, in turn, applies a logic 0 signal to an input of the AND gate 244 with the result that a logic 0 signal appears on the line 102 so that no further data can be entered from the keyboard 64. Thus, just as the symbol lock line, previously described with reference to FIG. 4, inhibits the entry of data by the keyboard 64 while a symbol is being read out of the symbol storage 104, so too, the counter 240 provides for a logic state of 0 on the line 102 to prevent further entry of data by the keyboard 64 after the maximum number of symbols, 16 in the preferred embodiment, have been entered into the message storage 106 of FIG. 4. During the reading out of data from the message storage 106 and the writing of this data on the recorder 24 of FIG. 1, the logic 1 signal on line 94, which is applied to the complemented input of the AND gate 242, similarly causes a logic 0 signal to appear on the line 102 for inhibiting the entry of data by the keyboard 64 during the printing of the message on the recorder 24. The logic 1 signal on line 94 is also utilized to reset the counter 240 to 0 as well as to reset the flip-flop 242 during the printing of the message on the recorder 24, so that at the completion of this printing the counter 240 and flip-flop 242 will be ready to monitor the number of symbols which may be entered by the keyboard 64. The setting of the flip-flops 242 also illuminates the lamp 246 to show an operator of the recording system 20 of FIG. 1 that a maximum length message has already been entered by the memory system 74.

Figure 9:
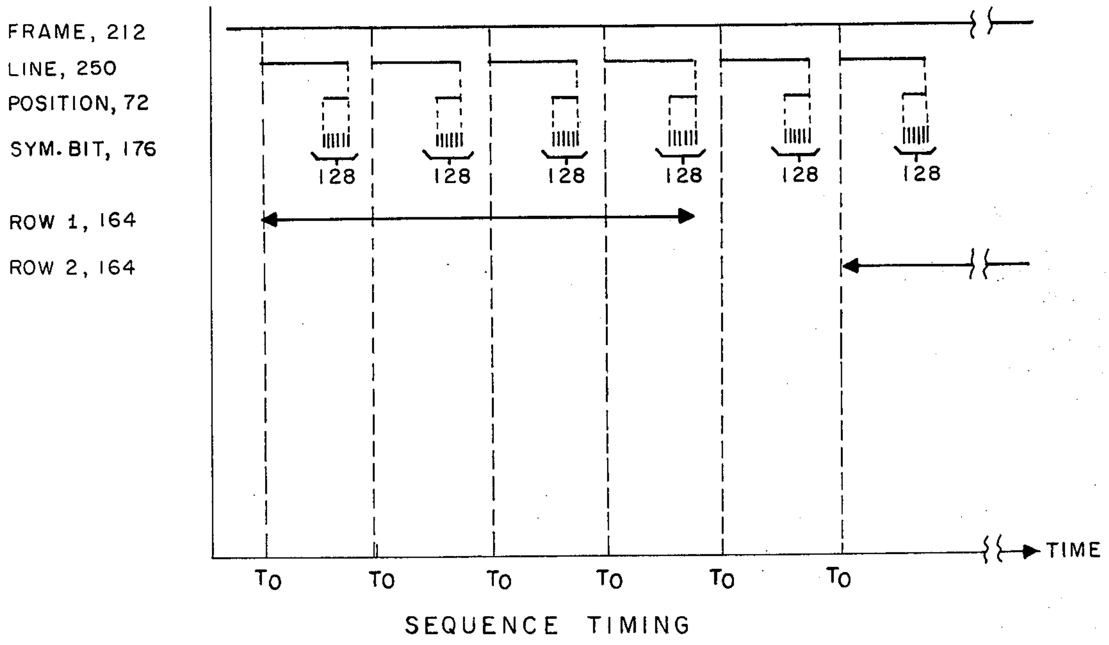
FIG. 9 is a timing diagram showing the operation of the sequencer of FIG. 2.

Referring now to the timing diagram of FIG. 9, there are seen the temporal relationships among various signals provided by the sequencer 82 of FIG. 6. On the time axis is seen a series of occurrences of the To pulse. The duration of the frame initiate signal on line 212 is seen to extend from a point in time prior to a To pulse and extends over numerous occurrences of the To pulse until terminated by the frame reset signal of the decoder 198 in FIG. 6. The line signal refers to the duration pf the logic 1 state on line 250 at the Q output of the flip-flop 184 of FIG. 6. It is seen that this signal extends from a To pulse until a time prior to the next To pulse when the flip-flop 184 is reset by the signal on line 224. The position signal represents the length of time that the flip-flop 186 remains in a set condition, this being the duration of the gating signal on line 72 of FIG. 6 which, as previously described, is the interval of time during which the message is being written. This is also the interval of time during which the symbol bit shift pulses appear on line 176, these pulses being seen in the timing diagram. The length of time that any one of the lines 164 is energized with a logic 1 state is also shown; the first of these lines is seen to be energized during an interval beginning with a To pulse and terminating at a point in time prior to a To pulse, this termination occurring when a count is received along line 228 of FIG. 6 whereupon the next of the lines 164 becomes energized with a logic 1 state.

It is understood that the above-described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. A recording system comprising:

means for portraying data;

means for storing a plurality of symbols, each of said symbols comprising a plurality of points, said plurality of points for each of said symbols being stored in a predetermined sequence;

means coupled to said symbol storage means for selecting symbols;

means coupled to said symbol storage means for reordering subsequences of said stored points of said selected symbols; and means coupled between said reordering means and said portraying means for forming an output sequence of said subsequences of symbol points, said sequence forming means applying said output sequence to said portraying means.

2. A system according to claim 1 wherein said symbol storing means includes means for sequentially reading out points of said stored symbols.

3. A system according to claim 2 wherein said reading out means comprises means for counting said points.

4. A system according to claim 2 wherein said reordering means comprises means coupled to said reading out means for counting points of said subsequences.

5. A system according to claim 4 wherein said reordering means further comprises means coupled to said point counting means for counting the number of said subsequences.

6. A system according to claim 5 wherein said reordering means further comprises means coupled to said symbol storing means for storing said subsequences, said subsequence storing means comprising a plurality of storage channels, each of said storage channels being selectively coupled to said symbol storing means for storing individual ones of said subsequences.

7. A system according to claim 6 wherein said reordering means further comprises means coupled to said subsequence counting means for selectively coupling individual ones of said storage channels to said symbol storing means.

8. A system according to claim 7 wherein said storage channels are recirculating registers.

9. A system according to claim 8 wherein said output sequence forming means comprises means for selectively coupling said portraying means to individual ones of said recirculating registers for extracting stored points therefrom, said forming means including means for signaling said recirculating registers to perform a recirculation of points stored therein.

10. A system according to claim 9 wherein said signaling means includes means synchronized with said selective coupling means of said forming means for counting increments of time, said time increment counting means being coupled to said selective coupling means for signaling said selective coupling means to select a different one of said recirculating registers at the end of a predetermined number of said counted increments of time.

11. A system according to claim 7 wherein said sequence forming means comprises means coupled to said portraying means for synchronizing said selective coupling means with said portraying means.

12. A system according to claim 11 wherein said portraying means includes a stylus and means for moving said stylus in synchronism with said selective coupling means.

13. A system according to claim 7 wherein said sequence forming means comprises means for providing spaces between successive ones of said subsequences as are stored in one of said storage channels.

14. In combination:

a first storage medium for storing a plurality of portions of each of a plurality of symbols;

a second storage medium for storing a plurality of portions of each of a plurality of symbols;

means coupled between said first storage medium and said second storage medium for transferring portions of one of said symbols from said first storage medium to said second storage medium, said transferring means including means for reordering the arrangement of the storing of said portions of said symbol;

means for imprinting symbols;

means coupled between said imprinting means and said second storage medium for sequentially reading out sequences of said portions of a symbol stored in said second storage medium; and means coupled to said imprinting means and to said read-out means for synchronizing said reading out with said imprinting.

15. A combination according to claim 14 wherein said transferring means includes means for sequentially selecting symbols of said first storage medium to be transferred to said second storage medium.

16. A combination according to claim 15 wherein said transferring means is actuated by said selecting means for transferring the portions of a plurality of symbols sequentially in accordance with a sequential selection of symbols by said selecting means.

17. A combination according to claim 16 wherein said second storage medium comprises a plurality of memory channels, the portions of each symbol transferred by said transferring means being transferred by a plurality of sequences of said portions, said transferring means inserting each of said sequences of portions into corresponding ones of said memory channels.

18. A combination according to claim 17 wherein each of said memory channels is adapted to permit said sequences of symbol portions to be read out repetitively by said read-out means.

19. A combination according to claim 18 wherein said symbols are imprinted by a dot matrix representation, each of said symbol portions representing a dot of said matrix of one of said symbols, said first storage medium having said symbol portions arranged to permit the symbol portions to be placed in said transferring means by sequences of dots each of which represent a row of said matrix.

20. A combination according to claim 19 wherein said transferring means places a first row of dots for each of successive ones of said symbols successively in one of said memory channels, said transferring means placing a second row of dots for each of said symbols successively in a second of said memory channels of said second storage medium.

21. A combination according to claim 18 wherein said synchronizing means comprises a plurality of counters, the output of one of said counters being coupled to the input of a second of said counters, at least one of said counters being activated in response to a signal received from said imprinting means, said counters counting at a rate proportional to said imprinting, output signals provided by each of said counters upon its attaining a preset count being coupled to said reading out means and to said memory channels for designating the times of occurrence of the imprinting of each dot of the dot matrix for each of the symbols to be imprinted.

* * * * *